Patented Oct. 15, 1946

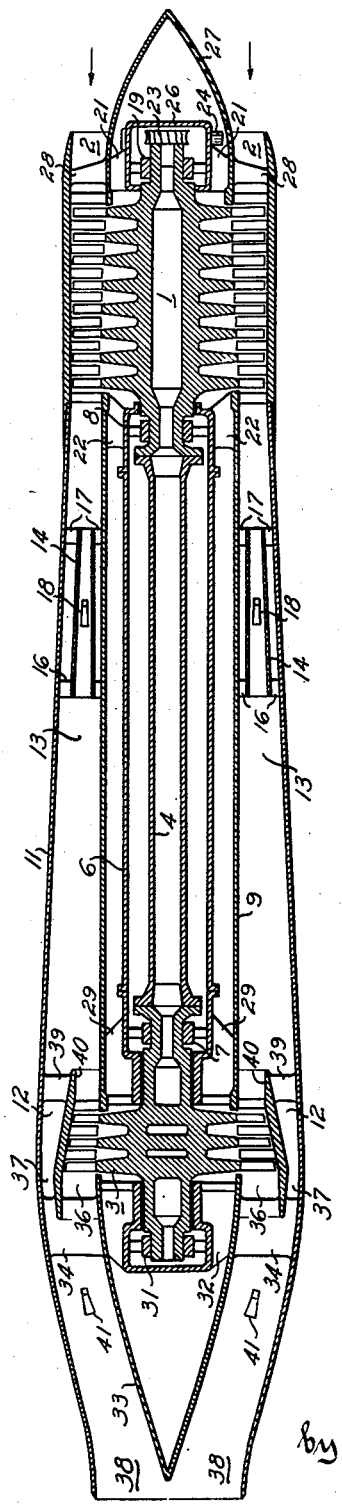

2,409,176

UNITED STATES PATENT OFFICE 2,409,176

GAS TURBINE SYSTEM

Robert C. Allen, Wauwatosa, Wis., assignor to Allis-Chalmers Manufacturing Company, Milwaukee, Wis., a corporation of Delaware Application April 10, 1942, Serial No. 438,367

5 Claims. (Cl. 60—35.6)

1

This invention relates generally to vehicle propulsion and more particularly to propulsive jet forming power units for aircraft and other types of vehicles.

Jet propulsion units heretofore proposed embodying a gas turbine and a compressor driven thereby are rendered impractical primarily because of their extremely low operating efficiencies, and it is therefore the main object of this invention to provide in a propulsive jet forming power unit of this type, an improved correlation of features affording a practical degree of operating efficiency. In accordance with this invention, a practical degree of operating efficiency is obtained by combining the elements of the unit (1) for operation with the highest permissible turbine inlet temperature and a conformingly high compression ratio, thereby developing a maximum of excess power (i. e., power in addition to that required by the compressor) under conditions effecting maximum thermal efficiency and, (2) for efficiently utilizing the excess power developed by the turbine to increase the propulsive effort of the propelling jet or jets.

Another object of this invention is to provide an improved jet propulsion unit embodying a propelling jet forming nozzle structure and a gas turbine driven compressor combination correlated in a novel manner to produce a large mass of jet forming gas and thereby a high propulsive effort under conditions effecting maximum thermal efficiency.

Still another object of this invention is to provide an improved jet propulsion unit embodying a gas turbine driven compressor combination correlated to operate with maximum thermal efficiency, to utilize the excess power developed by the turbine to materially increase the mass of jet forming gas, and to divide the large mass of jet forming gas between the turbine and a surrounding passage effective to provide concentric propelling jets affording a high propulsive effort.

Still another object of this invention is to provide in a jet propulsion unit an improved correlation of features comprising fluid compressing means, a gas turbine drivingly connected with the fluid compressing means, means forming a passage connecting the discharge of the fluid compressing means with the inlet to the turbine, means for highly heating the fluid flowing through the passage, propelling jet forming nozzle means, and means severally connecting the exhaust of the turbine and the passage with the nozzle means.

A further object of this invention is to provide an improved jet propulsion unit embodying a propelling jet forming nozzle structure and a gas turbine compressor combination correlated to provide a compact light weight unit which efficiently produces a high propulsive effort.

The invention accordingly consists of the various features of construction, correlations of elements and arrangements of parts as more fully set forth in the accompanying claims and in the detailed description, in which:

The drawing illustrates a jet propulsion unit embodying the invention.

Referring to the drawing, it is seen that a propulsion jet forming power unit embodying the invention may include an axial compressor 1 having a forwardly facing inlet 2, an axial flow gas turbine 3 axially spaced from and drivingly connected with the discharge end of the compressor 1 by means of a hollow shaft 4 disposed within a tube 6 connecting the housings of the adjacent turbine and compressor rotor bearings 7 and 8, respectively, an inner shell member 9 which surrounds the tube 6, an outer shell member 11 having its rear portion surrounding and forming with the casing of the turbine 3 an annular passage 12 and having its forward portion surrounding and forming with the inner shell 9 of an annular passage 13 which connects the discharge end of the compressor 1 with the inlet to the turbine 3 and with the passage 12, and a rearwardly flaring annular mixing and combustion tube 14 which is supported within the passage 13 by means of circumferential series of radially extending struts designated 16 and 17 and which has disposed therein a plurality of fuel nozzles 18.

The forward end of the compressor rotor is supported in a bearing 19 which is in turn supported by the forward end of the compressor casing by means of brackets or the like 21. The rear compressor bearing 8 is supported in a similar manner by brackets 22. The forward end of the compressor rotor is provided with a shaft portion which extends beyond the bearing 19 and carries a gear 23 meshed with a worm (not shown) on the transversely extending shaft 24 mounted for rotation in the gear box 26. The exposed end of the shaft 24 is splined as indicated for connection with a starting prime mover (not shown). The forward end of the compressor rotor, gear 23, gear box 26, and the exposed end of shaft 24 are enclosed in a casing member 27 which may be removably secured to the forward end of the compressor rotor and the struts 28 in order to afford ready access to the parts enclosed therein. The forward end of the compressor casing and the member 27 coact and form therebetween the annular inlet 2 for the compressor 1.

The forward bearing 7 of the turbine 3 is supported within the inner shell 9 by means of brackets or the like 29 which are formed integral with or secured to the forward end of the turbine casing. The rear end of the turbine rotor is supported by a bearing 31 which is in turn supported in a similar manner to the bearing 7 by means of brackets 32. The inner rear end of the turbine rotor and the bearing 31 are enclosed in a casing member 33 which may be removably secured to the turbine casing and the struts 34 in order to afford ready access to the parts enclosed therein. The casing member 33 coacts with the outer rear portion of the turbine casing and forms therewith an annular nozzle portion 36 through which the turbine exhausts and which is surrounded by the annular converging nozzle portion 37 formed between the rear end portion of the outer shell 11 and the outer rear end portion of the turbine casing. The rear end of the outer shell extends beyond the rear end of the turbine 3 and forms with the casing member 33 a rearwardly directed nozzle 38 into which the nozzle portions 36 and 37 discharge. The outer front end of the turbine casing is braced within the outer shell 11 by means of a circumferential series of struts 39 and is extended forwardly a material distance to provide in effect an annular dividing means 40 acting to apportion the fluid flowing rearward through the passage 13 between the inlet to the turbine 3 and the passage 12. Stated differently, the outer shell 11 coacts (1) with the inner shell 9 to form therebetween a high temperature motive fluid passage 13 connected with the discharge of the compressor 1, and (2) with the turbine casing to form therewith a surrounding passage 12 which connects the passage 13 with the nozzle portion 37, thereby providing in effect means severally connecting the nozzle 37 (also nozzle portion 38) and the turbine inlet with the high temperature motive fluid passage. In other words, the inner and outer shells coact with each other and with the compressor and turbine and form (1) a fluid heating passage means (the passage 13 which includes the mixing and combustion tube 14) connecting the discharge of the compressor with the turbine inlet, and (2) means comprising the passage 12, nozzle portion 37 and the nozzle portion 36 severally connecting the exhaust of the turbine and the heated passage with the nozzle portion 38.

In operation, the air discharged from the compressor 1 enters the passage 13 in which it is highly heated, preferably by the combustion of fuel therein as indicated, and the resulting mixture of combustion gases and excess air is apportioned between the turbine inlet and the passage 12. The passage 12 terminates in a converging nozzle portion 37 designed to maintain the desired pressure at the turbine inlet. The turbine exhausts through the annular nozzle portion 36 and the fluid in the passage 12 flows through the surrounding nozzle 37 and is combined with the exhaust from the turbine 3 in the continuing nozzle portion 38. If a greater propulsive effect is desired, the velocity of the gas in the nozzle portion 38 can be readily increased by employing one or more auxiliary fuel burning nozzles 41 as indicated, since the gases contain sufficient excess air to support combustion. The use of auxiliary fuel nozzles is desirable for accelerating the unit and the nozzle structure can be readily cooled to withstand the higher temperature thus produced, since it has no moving parts.

When considering the compressor, combustion chamber and gas turbine combination as an excess power developing unit, it must be borne in mind that within practical temperature limits the higher the turbine inlet temperature the higher the thermal efficiency and that the higher the turbine inlet temperature the higher the compression ratio for maximum thermal efficiency. Consequently, it should be obvious that in order to obtain maximum thermal efficiency for such a combination, it is necessary to operate under conditions effecting the highest permissible turbine inlet temperature and a conformingly high compression ratio, thereby developing a maximum of excess power, and that in order to obtain a high propulsive effort, it is necessary to efficiently utilize the excess power developed by the turbine to increase the propulsive effort of the propelling jet or jets. This result is accomplished in the unit shown and described for purposes of illustration by employing a compressor designed to utilize all of the excess power developed by the turbine in compressing additional air and by employing a dividing means operative to conduct all of the additional air; i. e., air in excess of that required for operating the turbine under conditions effecting maximum thermal efficiency, directly to the jet forming nozzle portion 38, thereby materially increasing (1) the mass of compressed, and in this case highly heated, air available for the production of a propulsive jet or jets, and (2) the propulsive effort.

The invention is applicable to all forms of jet propelling power units embodying said combinations and it should therefore be understood that it is not intended to limit the invention to the exact manner of combining and operating the elements of the unit as herein shown and described, as various modifications within the scope of the appended claims may occur to persons skilled in the art.

It is claimed and desired to secure by Letters Patent:

1. A jet propulsion unit comprising fluid compressing means having a forwardly facing inlet, a gas turbine axially spaced from and drivingly connected with the discharge end of said fluid compressing means, an axially extending conduit means interposed between and connecting the discharge end of said compressing means with the inlet to said turbine, means for highly heating the fluid flowing through said conduit means, propelling jet forming nozzle means, and means severally connecting the exhaust of said turbine and the passage formed by said conduit means with said nozzle means.

2. A jet propulsion unit comprising fluid compressing means having a forwardly facing inlet, a gas turbine axially spaced from and drivingly connected with the discharge end of said fluid compressing means, means forming an axially extending combustion chamber interposed between and connecting the discharge end of said compressing means with the inlet to said turbine, propelling jet forming nozzle means, and means severally connecting the exhaust of said turbine and said combustion chamber with said nozzle means.

3. A jet propulsion unit comprising fluid compressing means having a forwardly facing inlet, a gas turbine axially spaced from and drivingly connected with the discharge end of said fluid compressing means, means forming a coaxial passage connecting the discharge of said fluid compressing means with the inlet to said turbine, means for highly heating the fluid flowing through said passage, propelling jet forming nozzle means, and means severally connecting the exhaust of said turbine and said passage with said nozzle means.

4. A jet propulsion unit comprising fluid compressing means having a forwardly facing inlet, a gas turbine axially spaced from and drivingly connected with the discharge end of said fluid compressing means, means forming a coaxial passage connecting the discharge of said fluid compressing means with the inlet to said turbine, combustion apparatus in said passage, propelling jet forming nozzle means, and means severally connecting the exhaust of said turbine and the turbine inlet end of said passage with said nozzle means.

5. A jet propulsion unit comprising an axial compressor having a forwardly facing inlet, an axial flow gas turbine axially spaced from and drivingly connected with the discharge end of said compressor coaxial, rearwardly directed propelling jet forming nozzle means connected with the exhaust of said turbine, means forming a coaxial annular combustion chamber connected with the discharge of said compressor, and means forming inner and outer coaxial annular passages severally connecting the inlet to said turbine and said nozzle means with said combustion chamber.

ROBERT C. ALLEN.